United States Patent
Wesemann

(10) Patent No.: US 6,434,594 B1
(45) Date of Patent: Aug. 13, 2002

(54) VIRTUAL PROCESSING NETWORK ENABLER

(75) Inventor: Darren Wesemann, North Salt Lake City, UT (US)

(73) Assignee: Talk2 Technology, Inc., Salt Lake City, UT (US)

(*) Notice: Subject to any disclaimer, the term of this patent is extended or adjusted under 35 U.S.C. 154(b) by 0 days.

(21) Appl. No.: 09/265,287

(22) Filed: Mar. 9, 1999

(51) Int. Cl.$^7$ .............................................. G06F 15/16
(52) U.S. Cl. ..................... 709/201; 709/106; 709/205
(58) Field of Search ................................. 709/200, 325, 709/725, 102, 105, 100, 106, 108, 676, 201, 205; 707/10; 717/6, 149

(56) References Cited

U.S. PATENT DOCUMENTS

| | | | |
|---|---|---|---|
| 3,662,401 A | 5/1972 | Collins et al. ................. 444/1 |
| 4,780,821 A | 10/1988 | Crossley ..................... 364/200 |
| 4,893,234 A | 1/1990 | Davidson et al. ........... 364/200 |
| 5,261,097 A | 11/1993 | Saxon ......................... 395/650 |
| 5,329,626 A | 7/1994 | Klein et al. ................. 395/375 |
| 5,365,606 A | 11/1994 | Brocker et al. ............. 395/650 |
| 5,406,476 A | 4/1995 | Deziel, Jr. et al. .......... 364/402 |
| 5,442,791 A | 8/1995 | Wrabetz et al. ............. 395/650 |
| 5,446,841 A * | 8/1995 | Kitano et al. ............... 709/200 |
| 5,471,622 A * | 11/1995 | Eadline |
| 5,513,328 A | 4/1996 | Christofferson ............. 395/280 |
| 5,530,742 A | 6/1996 | Taylor et al. ............... 379/201 |
| 5,548,506 A | 8/1996 | Srinivasan ............... 364/401 R |
| 5,574,914 A | 11/1996 | Hancock et al. ........... 395/650 |
| 5,634,122 A | 5/1997 | Loucks et al. ............. 395/608 |
| 5,666,533 A | 9/1997 | Horiguchi et al. ......... 395/670 |
| 5,689,638 A | 11/1997 | Sadovsky ............... 395/188.01 |
| 5,689,708 A | 11/1997 | Regnier et al. ............. 395/682 |
| 5,704,012 A | 12/1997 | Bigus ........................... 395/22 |
| 5,745,652 A | 4/1998 | Bigus ........................... 395/22 |
| 5,778,222 A | 7/1998 | Herrick et al. ............. 395/609 |
| 6,009,472 A | 12/1999 | Boudou et al. ............. 709/232 |
| 6,049,798 A * | 4/2000 | Bishop et al. ................. 707/10 |
| 6,052,729 A | 4/2000 | Robinson ..................... 709/224 |
| 6,078,945 A * | 6/2000 | Hinsley ....................... 709/105 |
| 6,098,111 A * | 8/2000 | Maegawa et al. |
| 6,115,646 A * | 9/2000 | Fiszman et al. |
| 6,126,331 A | 10/2000 | Komatsu et al. ............ 395/706 |
| 6,330,586 B1 * | 12/2001 | Yates et al. |
| 6,339,840 B1 * | 1/2002 | Kothari et al. |

* cited by examiner

*Primary Examiner*—Ayaz Sheikh
*Assistant Examiner*—Oanh L. Duong
(74) *Attorney, Agent, or Firm*—Workman, Nydegger & Seeley

(57) ABSTRACT

A system and method for distributing the execution of computer application programs among one or more computational resources over a computer network is described. This invention also manages the execution to optimize program execution, thereby permitting the multiplication of computational resources of a number of common computer resources linked by a computer network into the computational power commonly associated with supercomputers. This invention permits the automation of complex processes generally considered beyond the computational power of typical desktop computers by dividing and managing the process among a number of such computers connected by a computer network, which can then operate in parallel to maximize computational efficiency. This invention permits improved efficiency of communication between entities doing work on an application, whether a computer, device or person entity. This invention supports a wide variety of device types and computer operating system platforms. Application program tasks are synchronized and parallel execution is enabled. A simple easy to use user interface is provided, along with extensive error handling. This invention is computer platform-independent. It uses shared memory space between platform boundaries, allowing process to be developed independent of data movement and/or translation.

16 Claims, 15 Drawing Sheets

Microfiche Appendix Included
(4 Microfiche, 349 Pages)

VIRTUAL PROCESSING NETWORK ENABLER

BACKGROUND OF THE INVENTION

1. Field of the Invention

This invention relates to computer software adapted for execution on a computer network. More specifically, this invention relates to the management and distribution of computer application program execution on a computer network containing various resources.

2. Description of Related Art

Many modern business computer applications require the division and distribution of processing tasks between several computational resources. A variety of systems and processes have been developed to manage and/or distribute computer processes across a network. Some such approaches include, PVM, developed by Oak Ridge National Labs, which is a set of programming libraries to allow a user to build "multicomputers," which is a set of independent machines on a network that share application processing to create heterogeneous network computing; Inferno, a Lucent Technologies programming language, "virtual machine," and communications protocol; Jini, produced by Sun Microsystems, is a set of Java classes and a distributed computing model; Millennium, a Microsoft product that is comparable to Jini; Linda, a set of distributed computing functions, developed by Dr. David Gelemter of Yale University, to simplify parallel programming tasks distributed to multiple processors; JetSend, developed by Hewlett-Packard, lets peripheral devices communicate across a network; and Papers, a parallel processing mechanism that includes a hardware component for sharing memory and other resources, developed by Dr. Hank Dietz at Perdue University. (The inventor and applicant also wish to acknowledge the testing and evaluation support of Richard Newton of Kaysville, Utah.) Typically, these and other known techniques work on only limited networks, lack the ability to distribute application program processing across multiple computers, and/or work on only certain network systems or only with certain programming languages.

For general background material, the reader is directed to the following United States patents, each of which is hereby incorporated by reference in its entirety for the material contained therein.

U.S. Pat. No. 3,662,401 describes a method of computer program activity implementation through the use of automatic computation means whereby simultaneous execution of programs tasks to improve the system facility utilization.

U.S. Pat. No. 4,780,821 describes a procedure, which allows users of a computer system, that comprises a plurality of computers connected in a local area network to share both file resources and applications on the local area network without modification to existing programs that were designed to run in a non-network environment.

U.S. Pat. No. 4,893,234 describes an accelerator module for a data flow computer that includes an intelligent memory.

U.S. Pat. No. 5,261,097 describes a shell program, that is used in conjunction with a computer that has a multitasking operating system, to interprets sequences of commands, submitted as scripts, and passes the interpreted commands on to the operating system for execution.

U.S. Pat. No. 5,329,626 describes a computation management system for creating a number of agents to handle various aspects or portions of the computations to be performed.

U.S. Pat. No. 5,365,606 describes a virtual software machine that provides a virtual execution environment in a target computer for application software programs having execution dependencies incompatible with a software execution environment on the target computer.

U.S. Pat. No. 5,406,476 describes constrained resource allocation techniques that are implemented with a digital computer due to its improved speed and graphics capability, to allow for rapid resource constrained scheduling when given a precedence ordered list of activities.

U.S. Pat. No. 5,442,791 describes an integrated remote execution system that manages resources and provides for the distribution and remote execution of remote requests to those resources in a heterogeneous computer network environment that has a plurality of resources loosely coupled to each other.

U.S. Pat. No. 5,513,328 describes an apparatus for inter-process/inter-device communication in a system of multiple asynchronous devices, which uses processing resources in an event driven software architecture.

U.S. Pat. No. 5,530,742 describes an intelligent communications network having a service node that provides services for customers and includes a service defining apparatus for defining a plurality of services.

U.S. Pat. No. 5,548,506 describes an automated electronic network based project management server system, which automates the tasks of Project Management Coordination for organizational work-group team members.

U.S. Pat. No. 5,574,914 describes an apparatus and method for managing a number of data processing resources to produce one or more independent and separate data processing partitions.

U.S. Pat. No. 5,634,122 describes a system and method for controlling access to shared resources in a distributed computer system, by a local authorization token manager.

U.S. Pat. No. 5,666,533 describes a method and system for managing computer program execution is implemented in a set of callable run-time support services, which allows processes written in single or multiple languages to cooperate and behave in a predictable and orderly manner.

U.S. Pat. No. 5,689,638 describes a method and system for providing access to independent network resources, using logon data and server authentication data.

U.S. Pat. No. 5,689,708 describes a resource manager in a client/server 14 computer network that controls the availability of system resources.

U.S. Pat. Nos. 5,704,012 and 5,745,652 describe a resource allocation controller, for a system that comprises a plurality of resources for performing useful work, that is customized to the particular system's available resources and configuration, dynamically allocates resources and/or alters configuration to accommodate a changing workload.

U.S. Pat. No. 5,778,222 describes a method and system for managing access to a plurality of objects located on levels within a hierarchical structure in a data processing system.

SUMMARY OF THE INVENTION

It is desirable to provide a method and system for managing the execution of computer programs that may require more than one computing resource and to manage the distribution of the computer program's execution on a computer network.

Therefore, it is the general object of this invention to provide a method and system for the organization and management of the execution of computer programs using one or more computing resources.

It is a further object of this invention to manage the execution of computer programs over computer networks.

It is another object of this invention to provide efficient communication between computing resources executing a computer program.

Another object of this invention is to manage the various computing device types for execution of computer programs.

A further object of this invention is to provide computational task synchronization.

A still further object of this invention is to provide parallel execution of computer programs over one or more computing resources.

It is a further object of this invention to provide a system, which can manage the partial execution failure of a distributed computational task.

It is another object of this invention to provide a method and system, which automatically distributes application program execution among available computation resources.

It is still another object of this invention to provide a method and system, which permits complex computational systems to be built more quickly and to be executed more efficiently.

Another object of this invention is to provide a computer application model that simplifies the definition of an application process and then manages the complexities of the distributed execution of the computer application.

A further object of this invention is to provide a technique for defining business applications for execution using more than one computational resource over a computer network.

Another object of this invention is to provide a management method and system for distributing computational applications that ensures portability between the various applications being managed.

It is a further object of this invention to provide a computational method that supports polymorphism, which allows the definition of processors to be organized in an object-oriented manner.

It is another object of this invention to provide a method and system where each processor is identified by a standard interface.

These and other objects of this invention are intended to be covered by this disclosure and are readily apparent to those of ordinary skill in the art upon review of the following drawings, detailed description, claims and abstract.

Microfiche Appendix

This specification includes a Microfiche Appendix, which includes 4 pages of microfiche with a total of 349 frames. The microfiche appendix includes computer source code of one preferred embodiment of the invention. In other embodiments of the invention, the inventive concept may be implemented in other computer code, in computer hardware, in other circuitry or in a combination of these, or otherwise. The Microfiche Appendix is hereby incorporated by reference in its entirety and is considered to be a part of the disclosure of this specification.

DETAILED DESCRIPTION OF THE INVENTION

Figure 1:
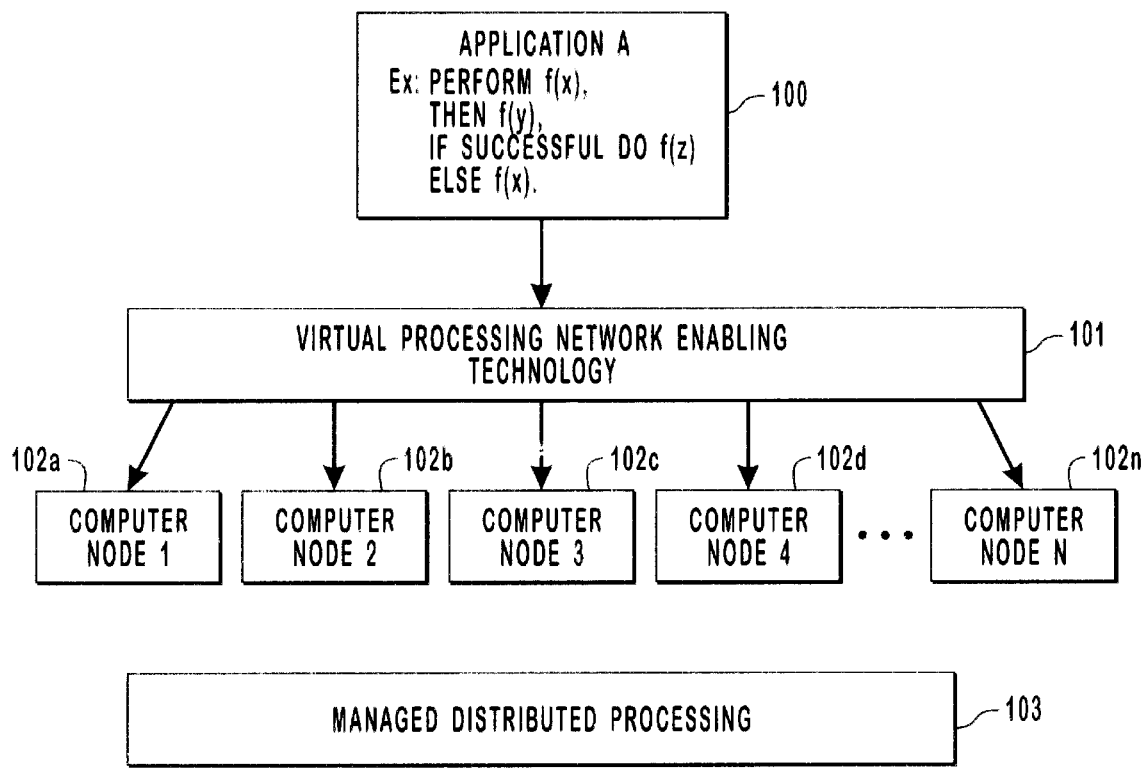
FIG. 1 depicts an overview of the virtual processing of this invention.

FIG. 1 shows an overview of the virtual processing system of this invention. The virtual processing enabler method and system of this invention permits a business and/or user to easily define applications, or solutions to problems, that may require computing resources from one or more computers, devices or individuals. This computational system manages the distribution of the application's execution on a computer network linking a plurality of various resources. The virtual processing system of this invention manages communication between entities, the various device types, task synchronization, parallel application execution and failure handling of a distributed task by abstracting the details associated with the diverse computers, devices and people. The method of this invention involves organizing the application process into components that perform work. For the purposes of this disclosure these components are referred to as "Virtual Processors." Each Virtual Processor is then defined in terms of its computational capabilities. For the purposes of this disclosure these capabilities are referred to as "Functions." A Virtual Processor is capable of performing its designated Functions one at a time, as dictated the a logic flow referred to in this disclosure as an "Application." A network of computers, or computer nodes, may contain any number of 2 Virtual Processors. The technology of this invention provides a layer of abstraction for an Application and manages the parallel distribution of work. The overview of this invention, as shown in FIG. 1, depicts an application example 100, which communicates with the system of this invention 101. The Virtual Processing Network Enabling Technology (VIPRNET) 101 abstracts Functions from the Application 100 for the Virtual Processors contained on the network of computer nodes 102a–n. An example Application is a command such as: perform Function f(x), then f(y)—if successful, do f(z), otherwise perform f(x) again. The VIPR- NET 101 manages the execution of the Function by finding an available Virtual Processor with the capability of performing the Function. With the completion of each Function, the next step is determined by providing the return condition of the previous Function to the Application 100 and requesting the execution of the next Function. Each computer node 102*a–n* contains one or more Virtual Processors. By passing Functions individually to one or more Virtual Processors, the computation of the Application 100 is distributed among several computer nodes 102*a–n*. This distributed processing is managed 103. An exemplary management command is: Run f(x) on Node 1, VP 1, then f(y) on Node 1 VP 2. If successful, then run f(z) on Node 2 VP 1, otherwise perform f(x) on Node 3 VP1.

Figure 2:
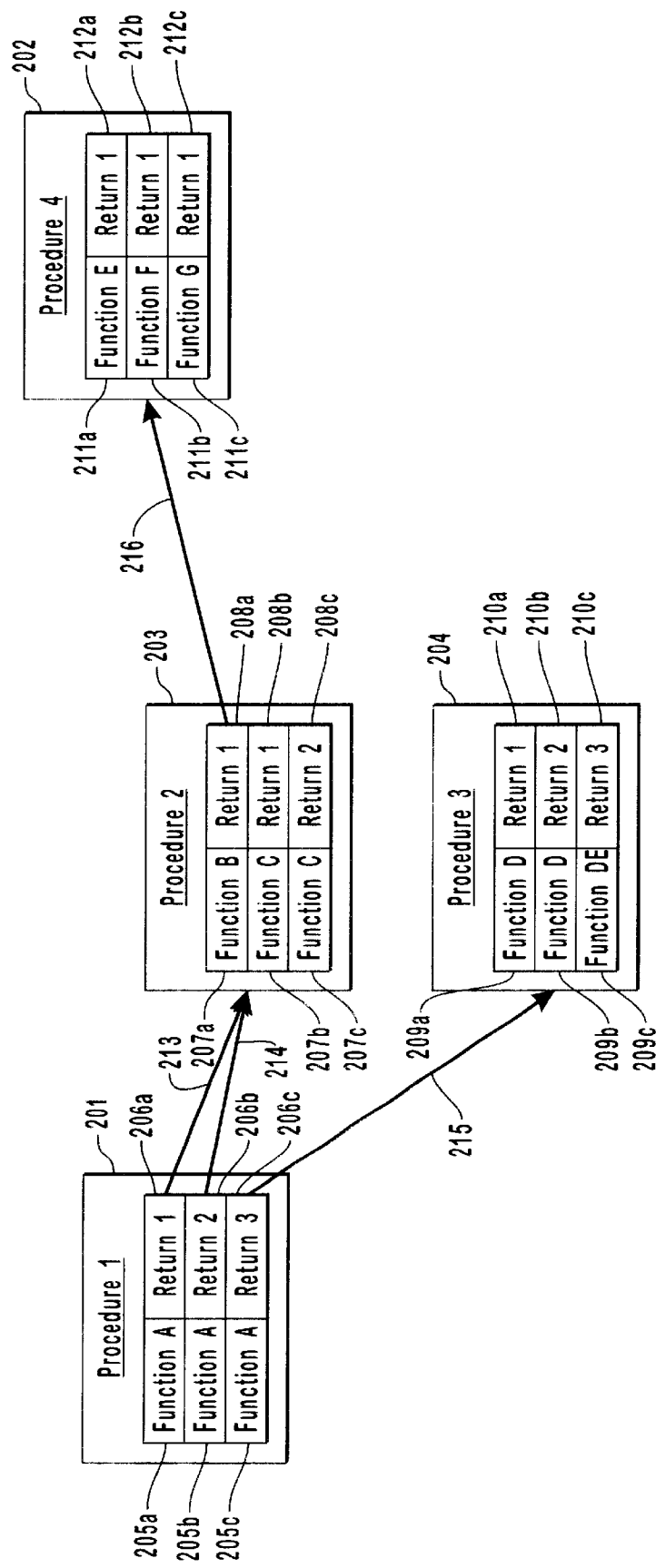
FIG. 2 depicts a flow diagram of the definition of an application of this invention.

FIG. 2 shows a flow diagram representation of the definition of an Application as used in this invention. An Application definition in the Virtual Processor is similar to producing a flow chart. Once the Application logic is defined, ViPrNET distributes the required work across a network of resources of various types. This distribution of work can be performed in parallel, thereby effectively multiplying the apparent processing power of computers on a local area network (LAN). In an Application, Virtual Processor Functions are organized into Procedures 201, 202, 203, 204. Each Procedure can contain any number of functions 205*a–c*, 207*a–c*, 209*a–c*, 211*a–c*. The functions 205*a–c*, 207*a–c*, 209*a–c*, 211*a–c* within a Procedure 201, 202, 203, 204 are executed simultaneously. The Procedures 201, 202, 203, 204 next stores the next procedure to run based on the available return conditions of each function 205*a–c*, 207*a–c*, 209*a–c*, 211*a–c*. Input and output data is also stored and managed by the Procedures 201, 202, 203, 204. In the example Application definition provided in FIG. 2, four Procedures 201, 202, 203, 204 are organized. Procedure 1 201 has three functions 205*a–c* with three corresponding returns 206*a–c*. Returns 1 206*a* and 2 206*b* of Procedure 1 201 communicate with Procedure 2. Return 3 206*c* of Procedure 1 201 communicates with Procedure 3 204. Procedure 2 has three functions 207*a–c*, with Return 1 208*a* communicating with Procedure 4 202. Procedure 3 204 has three functions 209*a–c* and three Returns 210*a–c*. Procedure 4 202 has three functions 211*a–c* and three Returns 212*a–c*.

Figure 3:
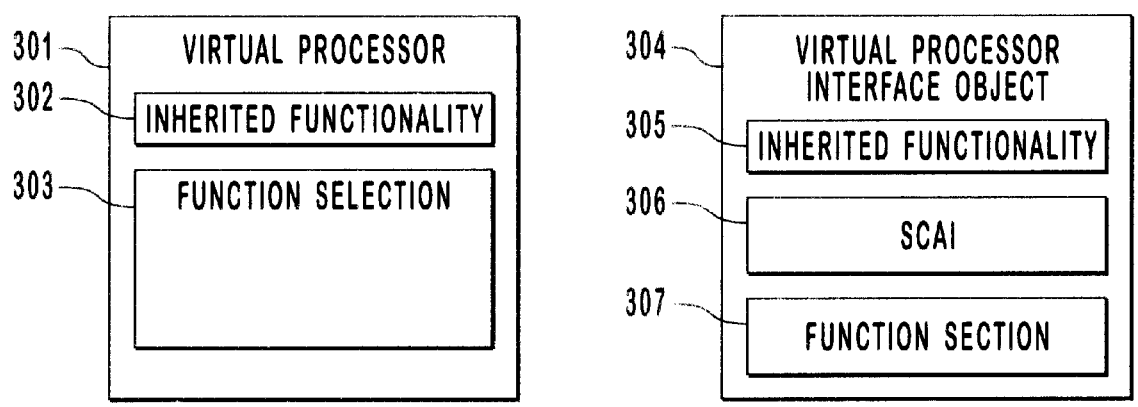
FIG. 3 depicts a definition of a virtual processor of this invention.

FIG. 3 shows the definition of a Virtual Processor in this invention. A Virtual Processor 301 may either be built by programming in one of several supported languages, or dynamically through a Virtual Processor Interface Object 304. Writing a Virtual Processor 301 definition involves defining in the Function Section 303 each Function the Virtual Processor 301 is capable of performing. A Virtual Processor 301 also inherits functionality 302 from a provided parent object, thereby providing the rest of the functionality required to make a Virtual Processor 301 active. Dynamically defining a Virtual Processor using a Virtual Processor Interface Object 304, which includes the inherited functionality 305, a standard component aware interface (SCAI) 306, and the function section 307, requires an existing set of component objects formatted in one of the supported standards, including but not limited to Microsoft's COM, Sun Microsystems JavaSpaces, or such hardware cores as Xilinx DSP Core.

Figure 4:
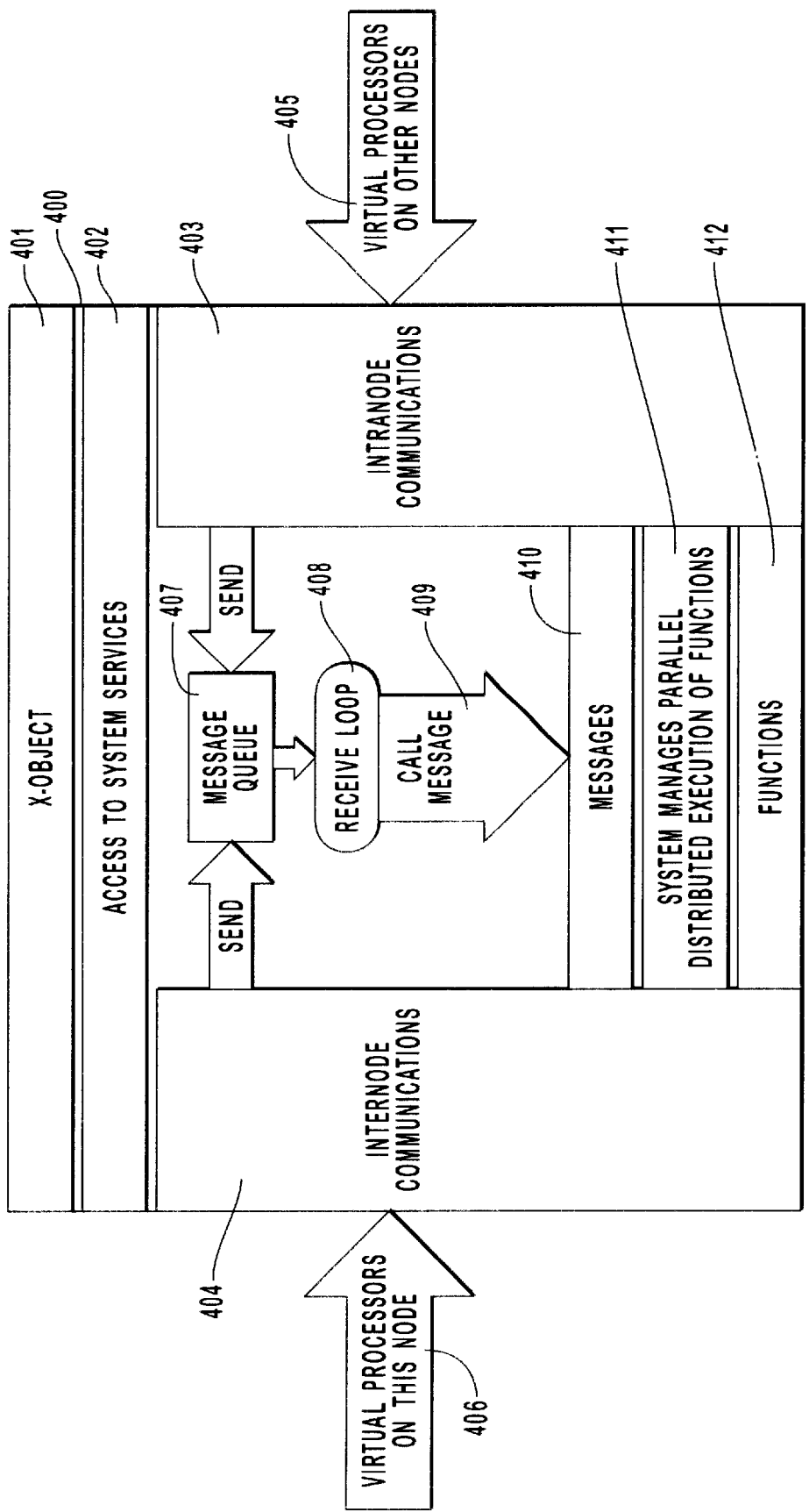
FIG. 4 depicts an internal anatomy of a virtual process of this invention.

FIG. 4 shows the preferred internal anatomy 400 of a Virtual Processor of this invention. Each Virtual Processor is implemented by inheriting the parent functionality of an object called XObject 401. XObject 401 provides access to the system services 402 and communicates with other Virtual Processors in the current computer node 406 as well as on other computer nodes 405 on the network. System messages 410 are used to manage the life of the Virtual Processor 400. Message management is preferably accomplished by sending messages from both inter-node communications 404 and intra-node communications 403, into the message queue 407. A receive loop 408 draws from the message queue 407 and calls the appropriate message 409. The XObject 401 parent manages the parallel-distributed execution 411 of Virtual Processor 4009 functions 412 as requested by the Application.

Figure 5:
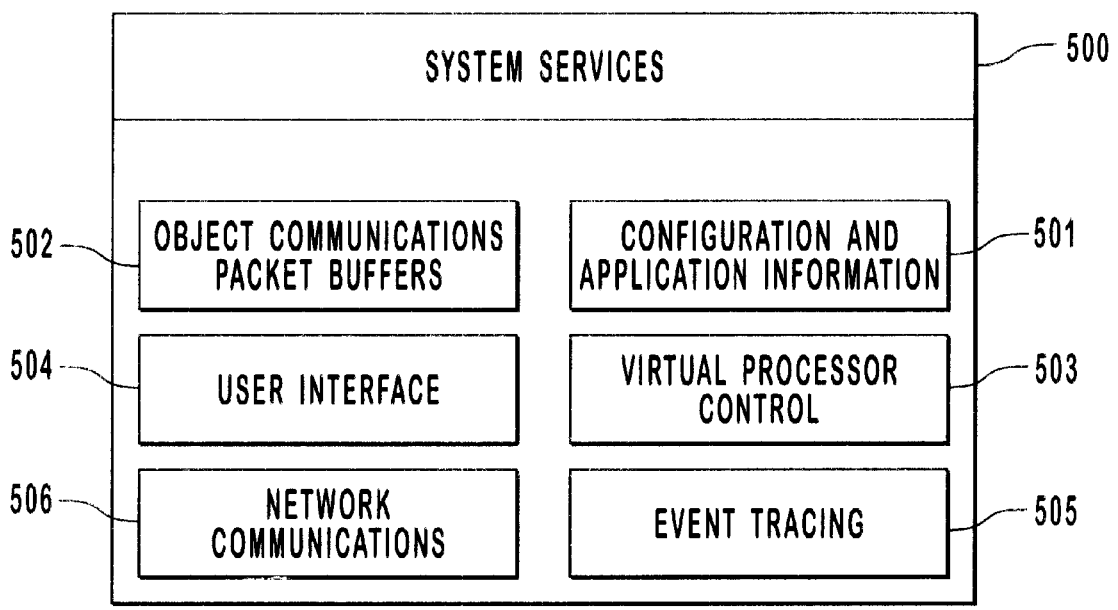
FIG. 5 depicts preferred system services of this invention.

FIG. 5 shows the preferred system services 500 of this invention. ViPrNET provides each Virtual Processor with access to system services 500 that permit this parallel distributed processing system to take place in an abstract manner. These services 500 are not typically used in the definition of a Virtual Processor, rather they are used by the inherited functionality 305 of XObject 401. In the preferred embodiment of this invention the system services 500 includes Object Communications Packet Buffers (XRecycle) 502, the User Interface (XWorkspace) 504, Network Communications (XSocket) 506, the Configuration and Application Information Processor (XDatabase) 501, the Virtual Processor Control Processor (XController) 503, the Event Tracing Processor (XTrace) 505. The Processor system services 501, 503, 505 are preferably Virtual Processors themselves. They inherit functionality from XObject as do all Virtual Processors, thereby allowing these objects to function in the application realm if required, as well as providing powerful functionality to the system as a whole.

Figure 6:
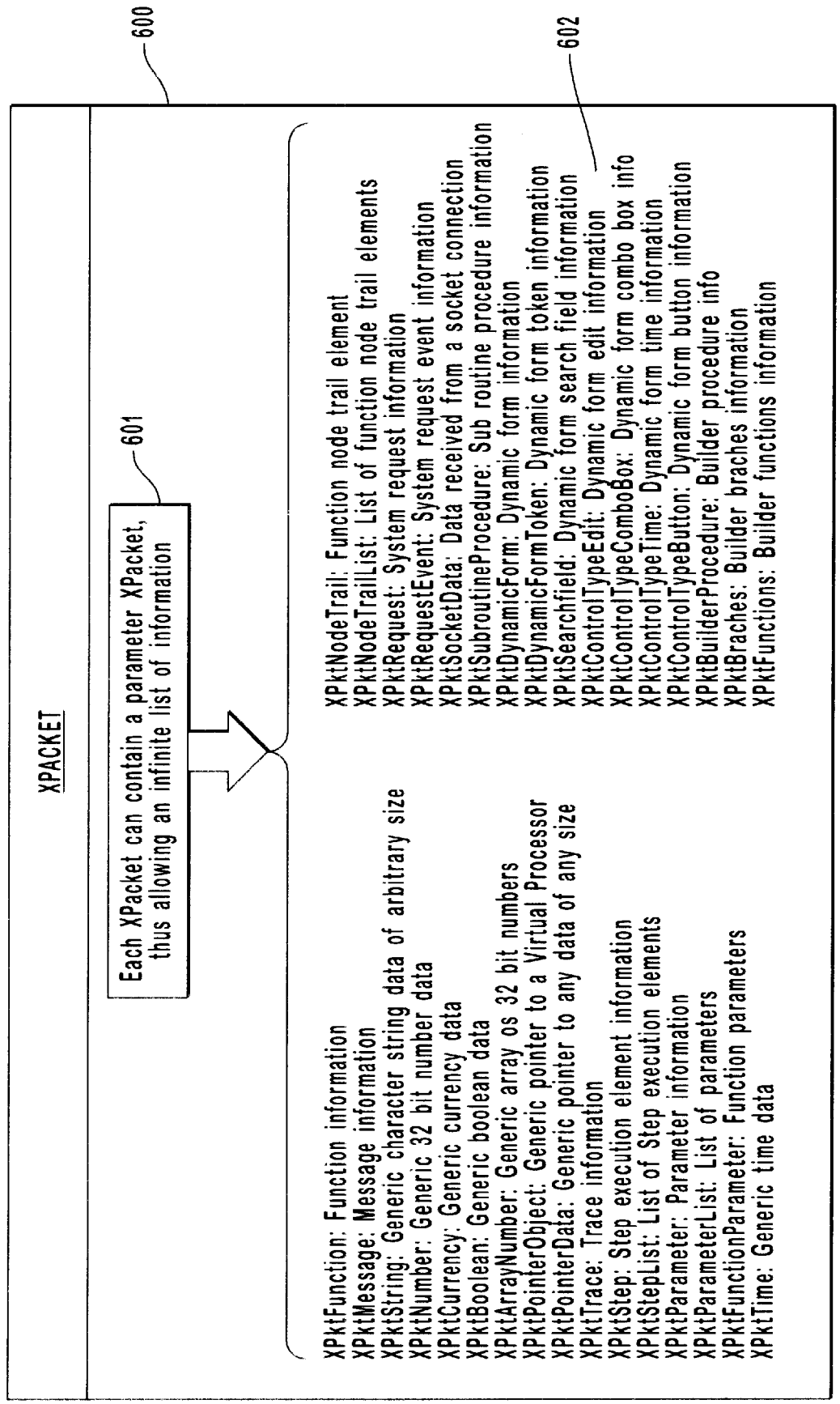
FIG. 6 depicts a preferred object communication packet buffer of this invention.

FIG. 6 shows a preferred object communication packet buffer of this invention. All communications between Virtual Processors is done through packet buffers called XPackets. Each XPacket 600 is accessible through a highly optimized buffer area called XRecycle. An XPacket can take a variety of forms, each of which is summarized in this figure. Each XPacket can contain an parameter XPacket 601 that allows a list of information 602.

Figure 7:
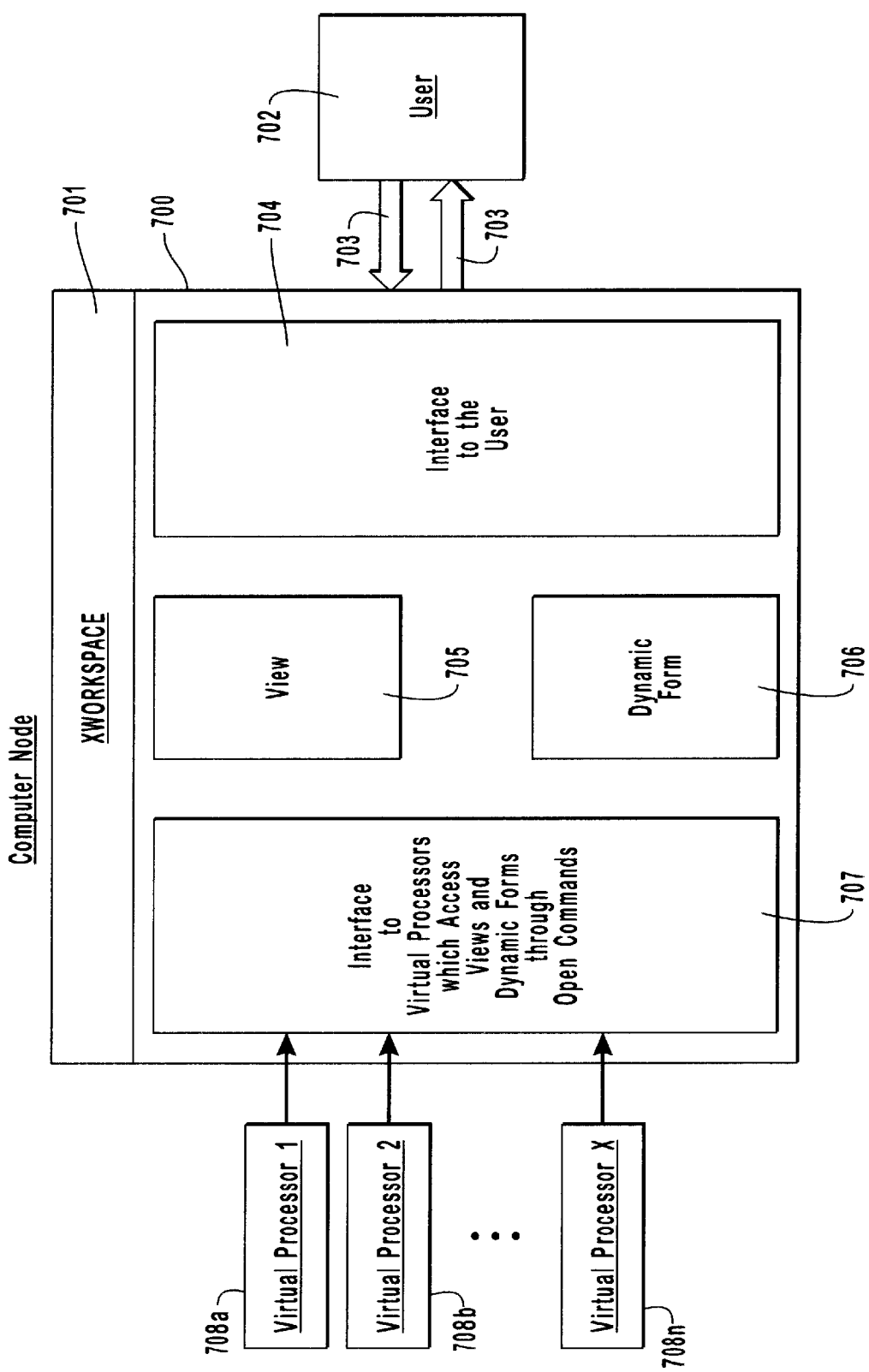
FIG. 7 depicts a block diagram of the preferred user interface of this invention.

FIG. 7 shows a block diagram of the preferred user interface of this invention. A computer node 700 interacts 703 with the user 702 through an object called XWorkspace 701, through which all user 702 interface 704 during the execution of an Application is done and through which dynamic requests for workspace formatted. Two primary interface formats are provided: View 705 and Dynamic Form 706. View 705 is used to list and display information. Dynamic Form 706 is used for user input and interaction. The XWorkspace 701 also has an interface 707 to the Virtual Processors 708*a–n*, to View 705 and Dynamic Form 706 through Open Commands.

Figure 8:
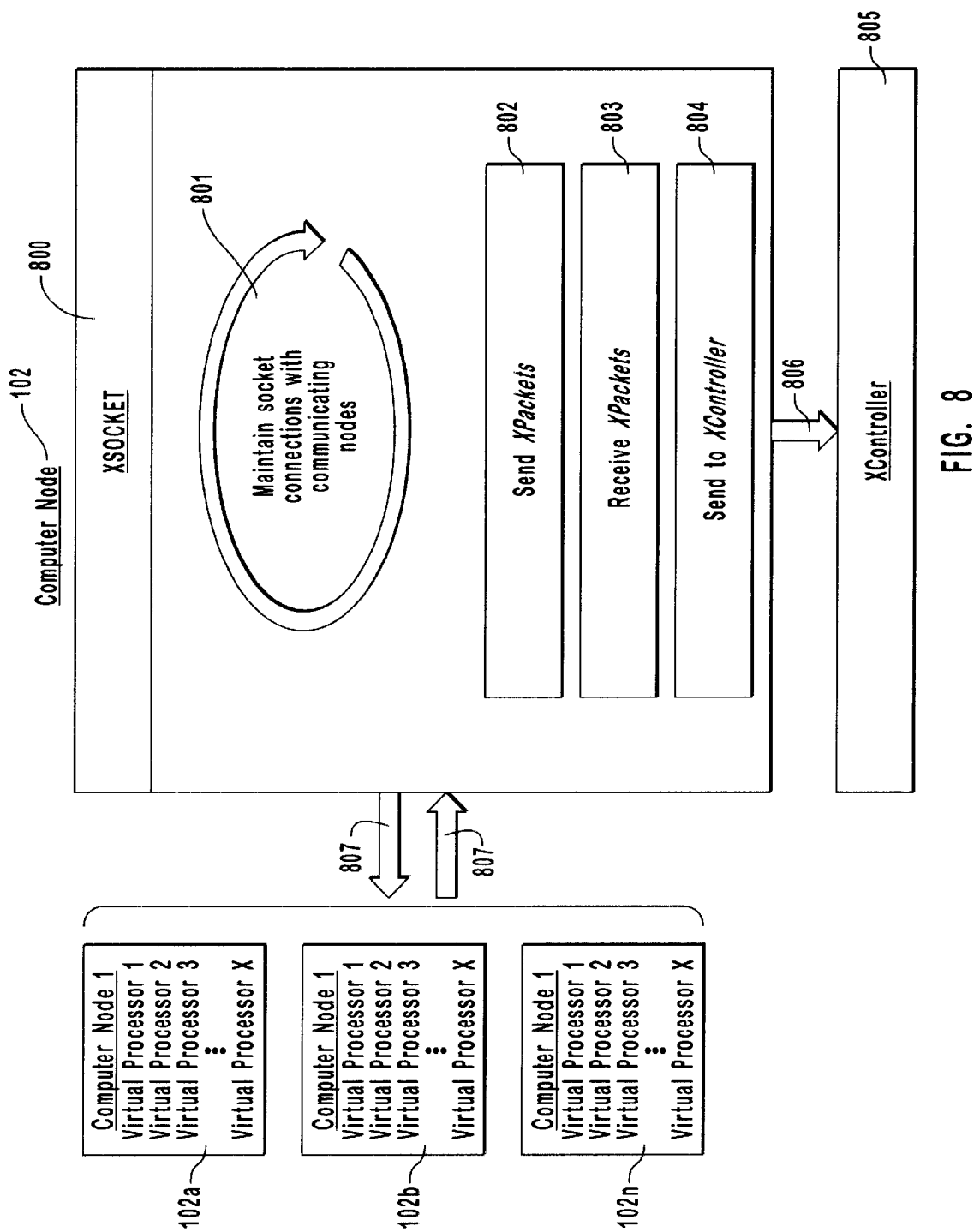
FIG. 8 depicts a block diagram of the preferred network communications of this invention.

FIG. 8 shows a block diagram of the preferred network communications interface of this invention. All communications 807 across the network between computer nodes 102, and therefore between Virtual Processors, is accomplished through an object called XSocket 800. The XSocket 800 objects maintains socket connections with communicating nodes 801 by sending XPackets 802, receiving XPackets 803, and by sending 804 information to XController 805 via a communication channel 806.

Figure 9:
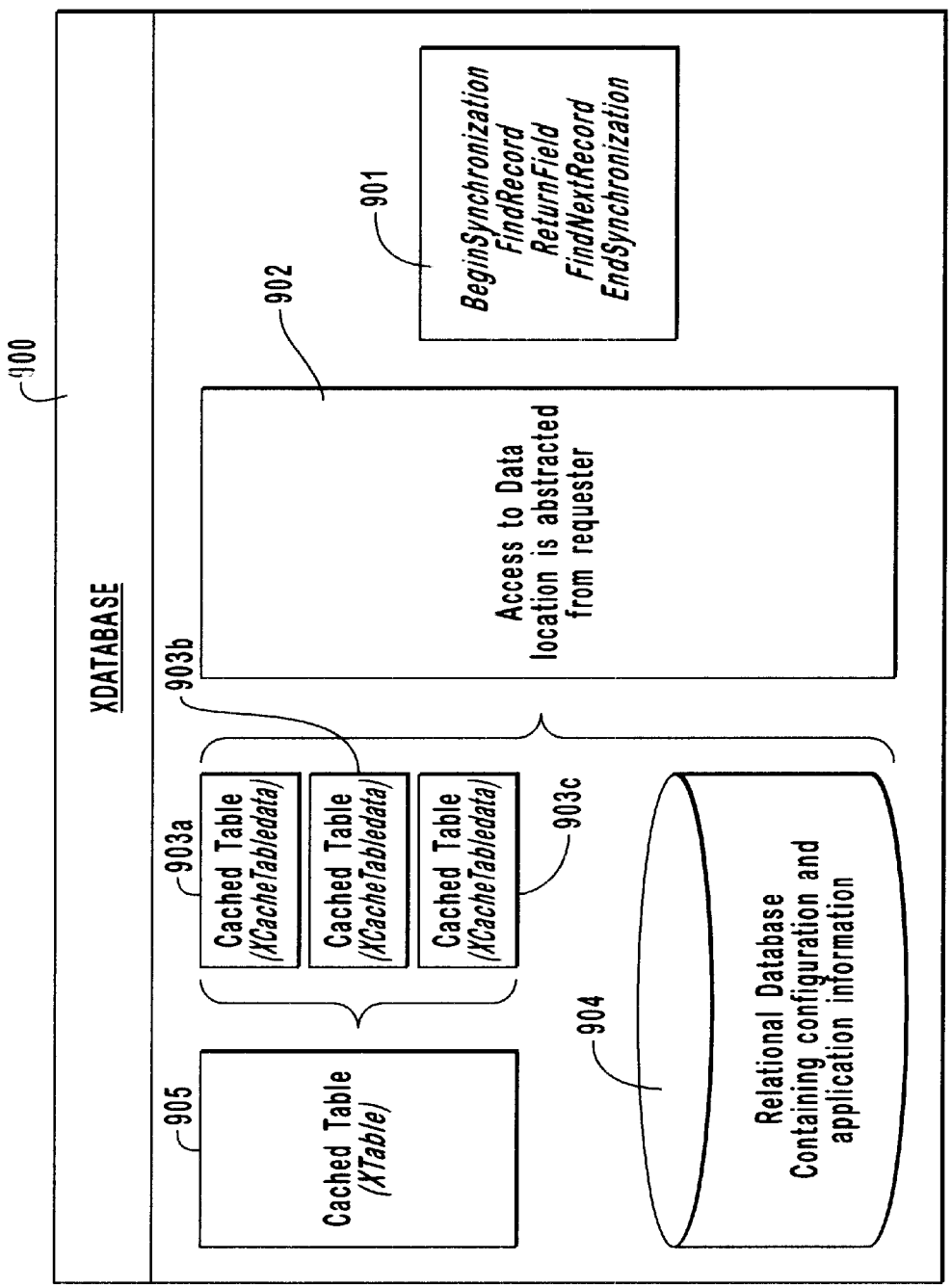
FIG. 9 depicts a block diagram of the configuration and application information of this invention.

FIG. 9 shows a block diagram of the preferred configuration and application information control of this invention. An object called XDatabase 900 is used to control access of configuration and application information. Information requiring rapid retrieval is cached. All access is abstracted from the exact location of the information, whether cached or stored on disk. XDatabase 900 includes the following routines 901: BeginSynchronization, to start the data synchronization between processors; FindRecord, to locate data records in the database; ReturnField, to return information to the database or user; FindNextRecord, to locate the next record in the database; and EndSynchronization, to end the data synchronization between processors. Access to the data location is abstracted from the requester 902. Table Data, that is Xcache TableData, is Cached 903a–c in a cached table (XTable) 905. While configuration and application information is stored in a relational database 904.

Figure 10:
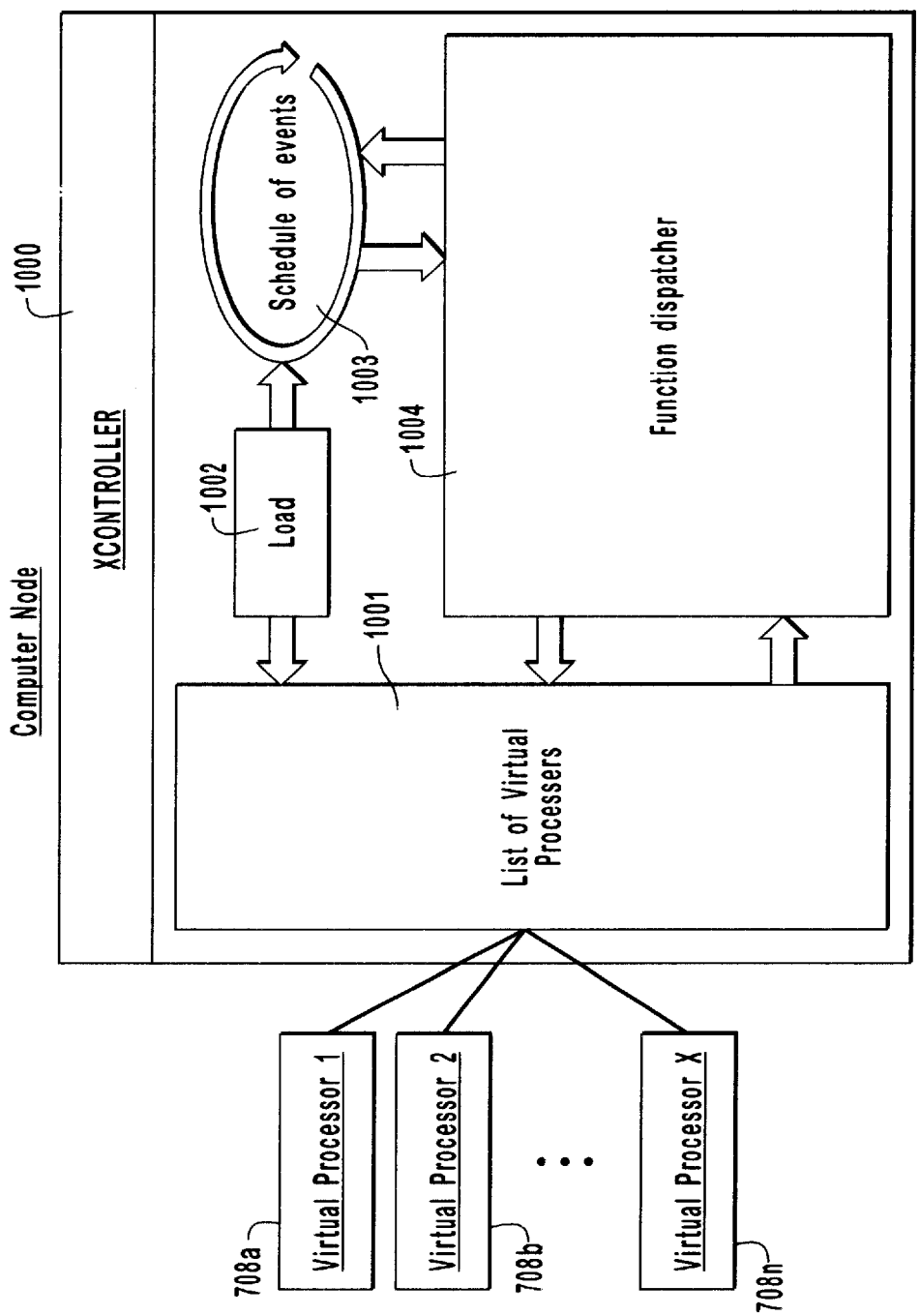
FIG. 10 depicts a block diagram of the preferred virtual process control of this invention.

FIG. 10 shows the block diagram of the preferred virtual process control of this invention. All Virtual Processors 708a–n contained within each computer are accounted for, managed, and maintained by an object called XController 1000. As Functions are requested for execution by the Application, the controller determines if a Virtual Processor 708 capable of performing the work is available. If such a Virtual Processor 708 is available, the controller then commands the Virtual Processor to begin the work. The preferred XController 1000 object includes a scheduler of events 1003 communicates between a load manager 1002 and a function dispatcher 1004. The load manager 1002 and the function dispatcher 1004 communicates with the available Virtual Processor 708a–n via a list of Virtual Processors 1001.

Figure 11:
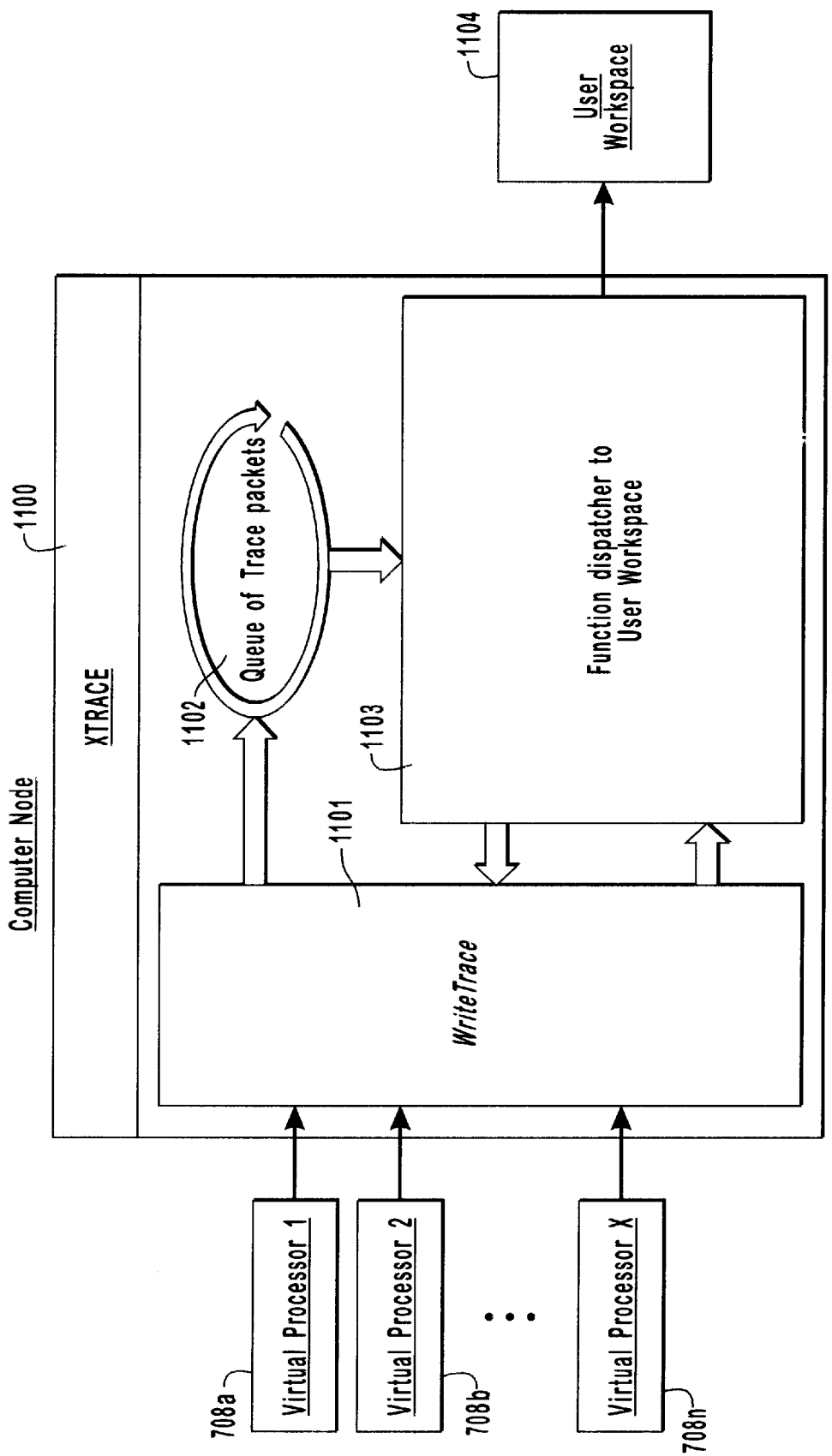
FIG. 11 depicts a block diagram of the preferred event tracing of this invention.

FIG. 11 shows a block diagram of the preferred event-tracing portion of this invention. The tracing of all system events, such as messages and error signals, are accomplished with an object called XTrace 1100. XTrace 1100 includes a trace packet queue 1102, which receives information from WriteTrace 1101 and sends packets to the Function dispatcher 1103 for communication to the User Workspace 1104. WriteTrace 1101 itself receives system events from the Virtual Processors 708a–n.

Figure 12:
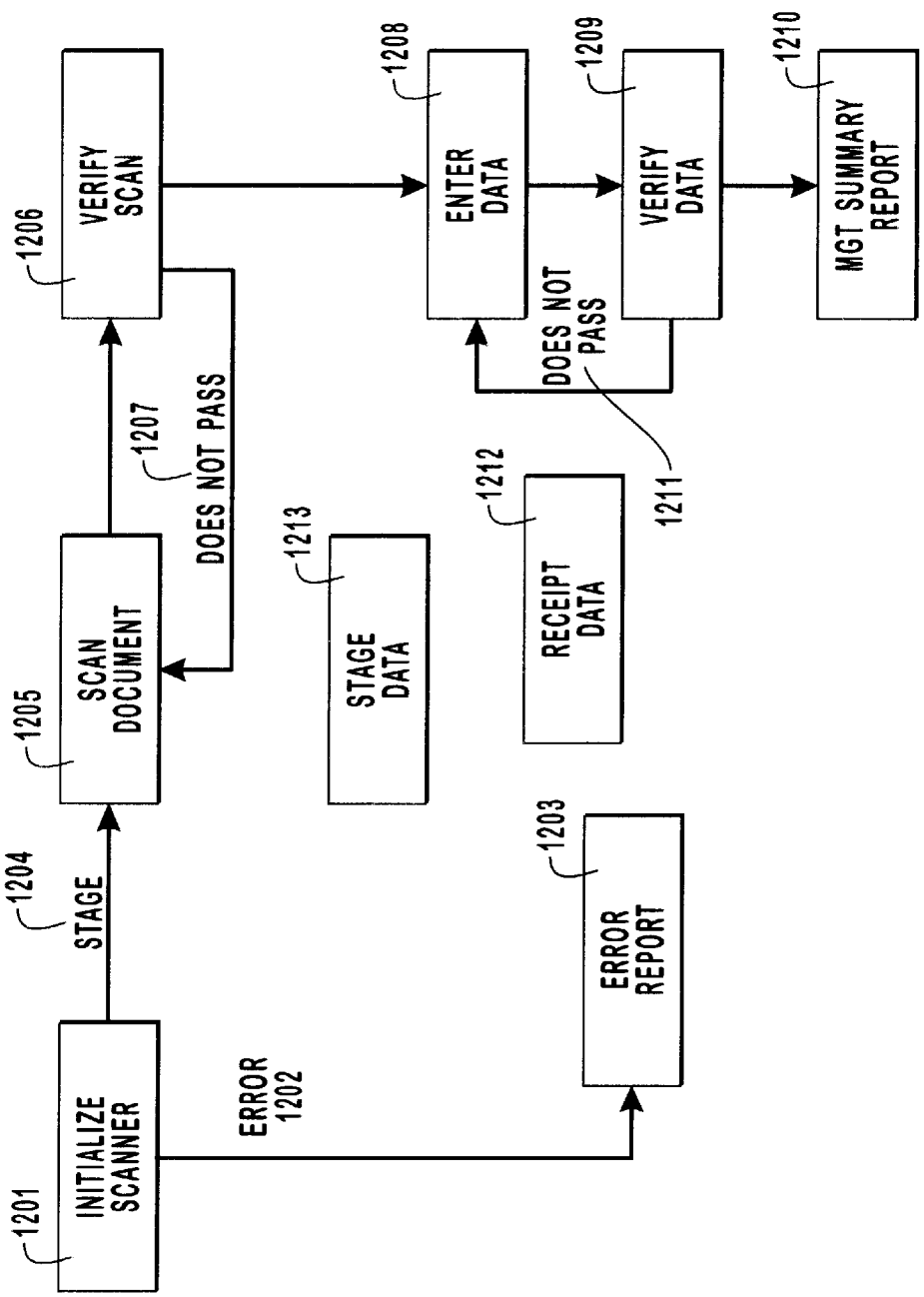
FIG. 12 depicts a flowchart of an example application using the preferred process of this invention.

FIG. 12 shows a flowchart of an example Application using the preferred process of this invention. This example Application is directed to the computational process of inputting and verifying data. The process of this invention identifies and manages the various components of the Application into Virtual Processors. It then manages the communication between Virtual Processors. In this example, the following components of the Application are assigned as Virtual Processors: initialization of a scanner 1201, if a scanner error is detected 1202 an error report 1203 Virtual Processor is initiated; if the scanner is staged 1204 a scan document 1205 Virtual Processor is begun; a Virtual Processor is assigned to verify the scan 1206, if verification fails 1207, the document is rescanned 1205; if the verification passes a Virtual Processor enters the data 1208; a Virtual Processor verifies the data 1209; if the data fails verification 1211 the data is reentered 1208; otherwise a management summary report Virtual Processor 1210 prepares a report. Other Virtual Processors used in this Application include staging data 1213 for preparing the data for scanning and receipt of data 1212 for receiving the data for the Application. Through the use of this invention, this Application is executed with many of the process steps or components being executed on a variety of processors in parallel, thereby permitting improved execution efficiency.

Figure 13:
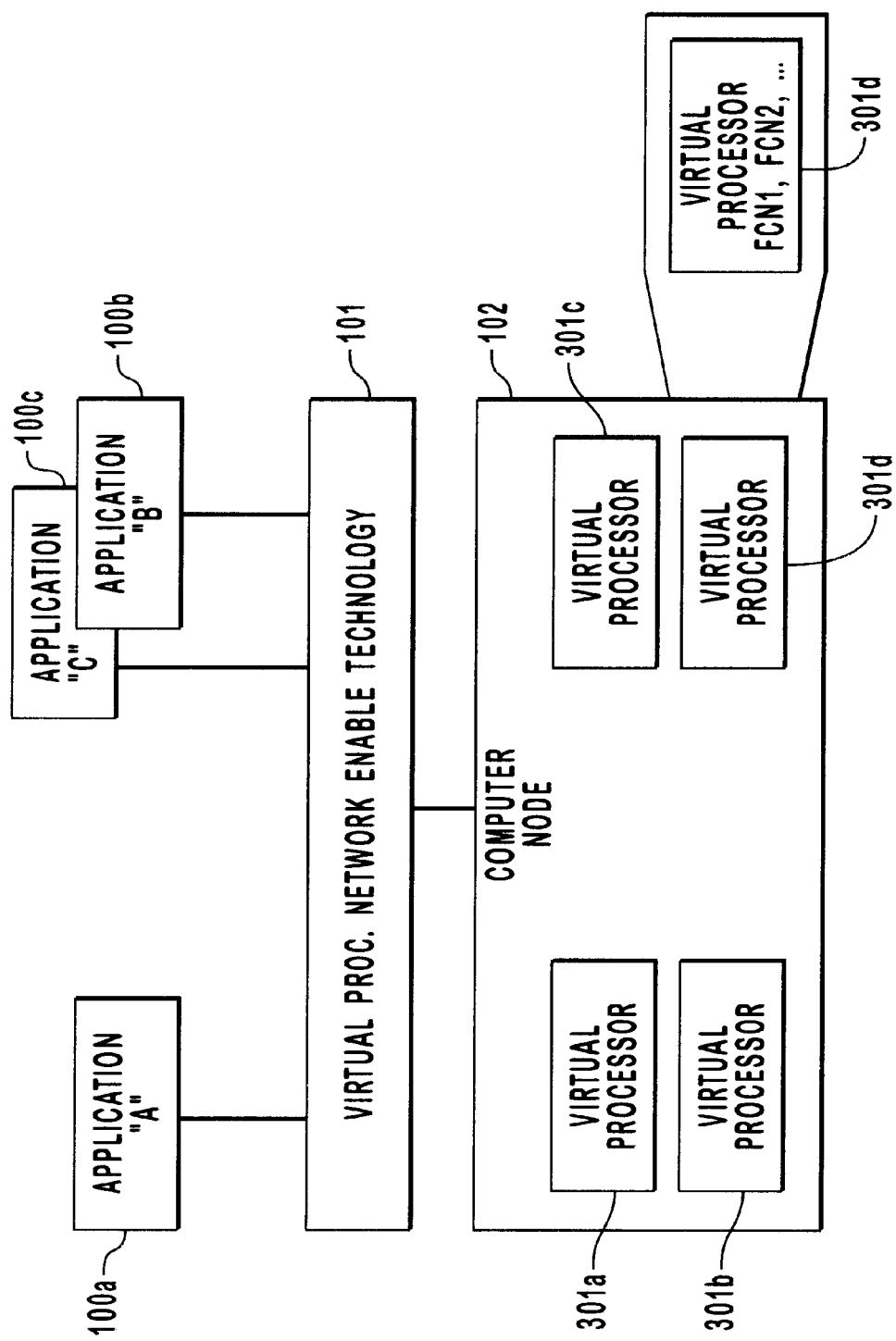
FIG. 13 depicts a block diagram of the preferred model definition of this invention.

FIG. 13 shows a block diagram of the preferred model definition of this invention. Multiple Applications 100a,b,c interface with the computer node 102 through this virtual processor network enabling technology of this invention 101. The computer node 102 further comprises a number of Virtual Processors 301a–d. Each Virtual Processor 301 further contains Functions required for the execution of an Application.

Figure 14:
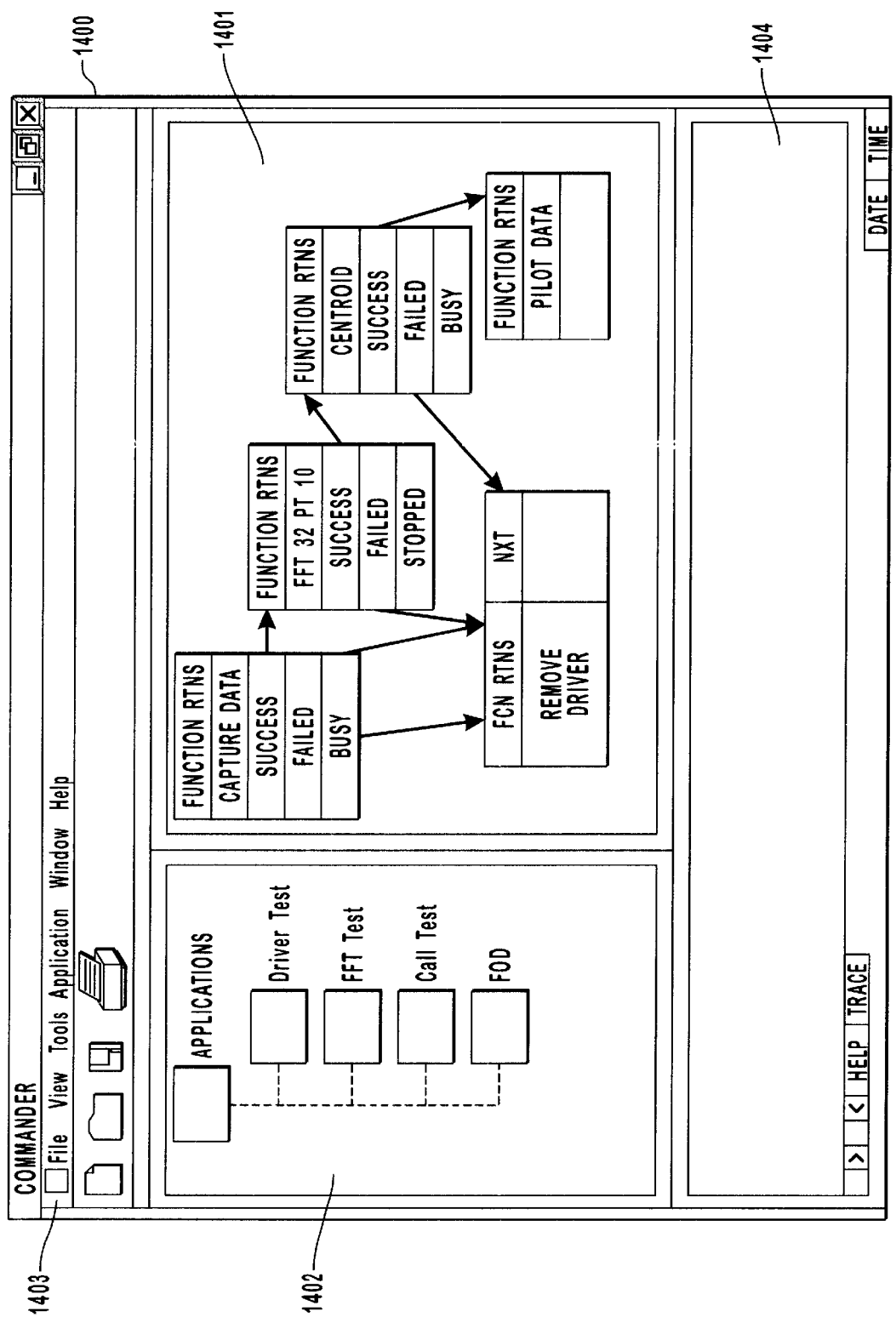
FIG. 14 depicts a user interface screen of the preferred embodiment of this invention.

FIG. 14 shows the preferred user interface screen of the preferred embodiment of this invention. The preferred screen 1400 is provided with a number of pull-down menus 1403 and several windows 1401, 1402, 1404. An Application window 1402 is provided showing the active components of the Application. An Application definition window 1401 is provided to show the allocation of Application components among Virtual Processors and their respective Functions. A window for user interface and communications 1404 is provided to permit communication with the user.

The preferred embodiment of this invention is accomplished through software executing on a variety of computer processors. The preferred computer software, included in a software source code microfiche appendix attached, is organized in to several modules.

A Resident Module, which is small, highly optimized code that is loaded into the background of each computer on the network. This module contains communications, shared memory and platform independence functionality to enable the computer to work in the community of Virtual Processing resources. The communications functionality layer moves data and instructions to and from the network locations of the target resources and does so with very little overhead. This communication function is abstracted to the Applications. Shared Memory permits each Function to input and/or output data. Data is accessible by any function on the execution path of the Application, regardless of the location of the running Function within the network. This data is managed by sharing memory between the computers on the network. This shared memory function is abstracted to the Applications. The platform independence resident module resides at a layer above the computer operating system. This permits a network of computer nodes running different operating systems to provide Virtual Processing resources as if they were all running the same operating system platform. The Application can then be executed on any Virtual Processor regardless of the platform. Presently preferred and supported operating system platforms include: Microsoft Windows 95, 98 and NT. Future contemplated platforms will include several popular versions of UNIX and other alternative platforms can be used without departing from the concept of this invention.

A commander module provides the following functionality: configuration and administration of the network of computers; definition of Virtual Processors; definition of Applications; and interaction with people performing work. Configuration and administration permits the definition of a network in terms of its computer nodes and the Virtual Processors to be loaded on the computer nodes. User security is also administered. The definition of Virtual Processors is currently performed in the C++computer language and the physical representation of the Virtual Processor is a Dynamic Linked Library (DLL). Once the DLL file is present, the commander module is used to define the functions residing within the Virtual Processor along with the DLL characteristics. Future contemplated developments will provide compatibility with JAVA. Also, libraries of Virtual Processors will be made available in addition to providing interfaces to intellectual property repositories such as CPRBA, COM and JavaSpaces. A framework for Application definition is provided within the commander module by using a graphical object called Builder. Each Application is represented in a flow chart fashion. FIG. 14 provides a screen print of the Builder utility within the commander module.

Figure 15:
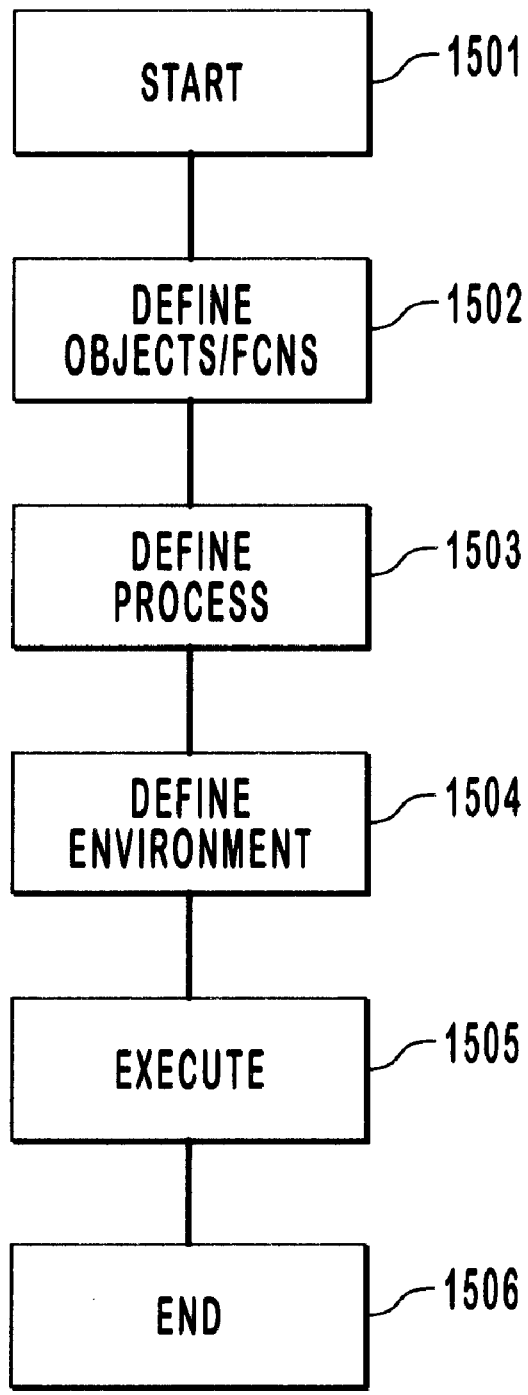
FIG. 15 depicts the preferred process steps of the method of this invention. Reference will now be made in detail to the present preferred embodiment of the invention, an example of which is illustrated in the accompanying drawings.

FIG. 15 shows the preferred method of this invention as implemented in the preferred embodiment previously described. As this invention provides a method of modeling real-world processes in a computer system, by providing a simplified definition and integration process and by managing the complexities of distributed computer program execution. For the purposes of this disclosure, the term process is defined to mean any administered operation typically performed in the workplace. Such processes involve objects, such as people, information, systems and business equipment. By way of definition, objects are those elements that perform the work defined within the process. Objects exist throughout a typical business organization. Generally, these objects interact with each other in a distributed process. Often the limitation on an organization is the ability of the objects to cooperate in accomplishing the organization's objectives. This invention provides a common interface between objects, including old, new and changing objects, thereby enhancing the cooperation between objects and accommodating the changing characteristics typical with objects. Initially 1502, an operation is identified for automation. The objects and their respective functions are defined 1502. In this step an operation is defined in terms of the components that combine to perform the work. These components are referred to here as objects. Each object is implemented by defining its capabilities as functions. Each virtual processor is capable of performing functions one at a time. Each object function is developed without the requirement of knowledge of the distributed characteristics of the runtime environment. Thereby, providing simplification, by abstraction, of the distributed processing and ensuring portability between the various processes requiring the service of an object's functions. Since this invention supports object oriented characteristics, including polymorphism, inheritance and encapsulation, this implementation of objects, is structured in objects that inherit functionality and type abstraction from parent objects. Functions common to multiple objects can be contained within parent objects, providing a novel object oriented and type abstracted framework.

Preferably, an object is defined in one of two ways: programming or dynamic. An object defined by programming is accomplished in one of several well known computer languages. A dynamically defined object is accomplished simply by defining each function that the object is capable of performing. The functionality required to activate an object is inherited from a parent object. Dynamically defining an object typically requires an existing set of component objects formatted in one of the supported standards, such as Microsoft's COM and DCOM or Sun Microsystems' Enterprise JavaBeans or OMB's Corba.

Next, the process is defined 1503 as a number of procedures. Each procedure flows from one to the next depending on the ending condition of the previous procedure. The work performed by a procedure is defined by the object functions defined in the previous step 1502. Each procedure may contain any number of functions. Typically and preferably, functions within a procedure are executed relatively simultaneously. Each function may require input data, may provide output data and typically ends with return conditions. Each function has access to information regardless of location and format. Data can be provided to the function at design time or at runtime. Based on the resulting return conditions, the subsequent procedural flow is defined. Procedural flow, see FIG. 2, is the basic structure of the process.

Next, the environment is defined 1504. The environment is the arrangement of objects on nodes in an enterprise. Each node is defined including the objects to be loaded on it. Each loaded object in the enterprise is referred to as a configuration. Again, the definition of the environment does not require specific knowledge of the process or the technical details of the object functions themselves, allowing for quick modification of the environment without re-engineering of the process.

The final step 1505 in the automating process is managing the execution of the process. This step 1505 typically and preferably involves enterprise resource management, real time monitoring views and data management. Data management is performed by a repository of organized data called accounts. Accounts store specified data related to a process, which may change the behavior of the process. The process of this invention ends 1506 with the completion of the execution of the process.

This invention manages distributed processing while minimizing the inherent complexity common to distributed computational processing. This management process is accomplished by abstracting details associated with diverse applications, databases, systems, devices and people. Access to data is provided independent of location and format. Application definition and integration is accomplished by using flowcharting and either with or without a program compiler.

The described embodiment of this invention, including the provided computer source code, are to be considered in all respects as only illustrative and not as restrictive. The scope of this invention is indicated by the appended claims rather than by the forgoing description, which is provided to enable a person of ordinary skill in the art to make and use this invention and to disclose the inventor's current best mode of this invention. All changes which come within the meaning and range of equivalency of the claims are to be embraced as within their scope.

I claim:

1. In a network that includes computers and devices capable of performing functions, a method of using a computer node of the network to control distributed execution of a process in the network, comprising the acts of:

using the computer node, defining objects in the network by performing the acts of:

defining each of one or more functional components of a computer that are available in the network as objects by defining functions that the particular functional component is capable of performing; and defining each of one or more devices other than computers that are available in the network as objects by defining functions that the particular device is capable of performing;

using the computer node, defining the process by defining a plurality of procedures, each being associated with one or more functions that are to be performed by an object in the network;

using the computer node, defining an environment of the network by defining a logical arrangement of the objects in the network; and executing the process in the network by using the computer node to identify the objects in the network that are available to perform the functions associated with the plurality of procedures of the process.

2. A method as recited in claim 1, wherein the act of defining objects in the network is performed using a programming language to define the objects.

3. A method as recited in claim 1, wherein the act of defining objects in the network is performed dynamically using an existing set of component objects.

4. A method as recited in claim 1, wherein at least one of the one or more devices comprises an electronics device operated by a computer.

5. A method as recited in claim 1, wherein at least one of the one or more devices comprises a device capable of receiving data.

6. A method as recited in claim 1, wherein at least one of the one or more devices comprises a device capable of outputting data.

7. In a network that includes computers and devices capable of performing functions, a method of using a computer node of the network to model a process such that the process can be executed in a distributed manner in the network, comprising the acts of:

using the computer node, defining objects in the network by performing the acts of:
        identifying one or more functional components of a computer that are available in the network;
        defining each of the functional components as objects by defining functions that the particular computer is capable of performing;
        identifying one or more devices other than computers that are available in the network; and
        defining each of the one or more devices as objects by defining functions that the particular device is capable of performing;
    using the computer node, defining an environment of the network by defining a logical arrangement of the objects in the network;
    displaying a graphical representation of the objects and the environment to a user of the computer node; and
    receiving user input at the computer node that defines the process by defining a plurality of procedures, each being associated with one or more functions that are to be performed by an object in the network, thereby modeling the process and preparing the process to be executed in the network by the objects in the network that can perform the functions associated with the procedures of the process.

8. A method as defined in claim 7, further comprising the act of modifying the environment by performing the acts of:

identifying a new computer that is to be made available in the network;
    defining a functional component of said new computer as a new object by defining functions that said functional component of said new computer is capable of performing;
    modifying the environment by adding the new object thereto; and
    modifying the display of the graphical representation by adding the new object thereto.

9. A method as defined in claim 7, further comprising the act of modifying the environment by performing the acts of:

identifying a new device other than a computer that is to be made available in the network;
    defining said new device as a new object by defining functions that said new device is capable of performing;
    modifying the environment by adding the new object thereto; and
    modifying the display of the graphical representation by adding the new object thereto.

10. A method as recited in claim 7, wherein the act of receiving user input at the computer comprises the act of receiving user input that manipulates the graphical representation of the objects and the environment.

11. A method as recited in claim 7, further comprising the act of executing the process.

12. A method as recited in claim 11, further comprising the act of storing data related to the process in an account during the act of executing the process.

13. In a network that includes computers and devices capable of performing functions, a method of using a computer node of the network to model a process such that the process can be executed in a distributed manner in the network, comprising the acts of:

using the computer node, defining objects in the network by performing the acts of:
        identifying one or more functional components of a computer that are available in the network;
        defining each of the one or more functional components as objects by defining, without respect to the process that is to be executed in the network:
            input conditions required by the particular functional component;
            functions that the particular functional component is capable of performing, one at a time, upon receiving the input conditions;
            return conditions provided by the particular functional component upon performing the functions;
        identifying one or more devices other than computers that are available in the network; and
        defining each of the one or more devices as objects by defining, without respect to the process that is to be executed in the network:
            input conditions required by the particular device;
            functions that the particular device is capable of performing, one at a time, upon receiving the input conditions;
            return conditions provided by the particular device upon performing the functions;
    using the computer node, defining an environment of the network by defining a logical arrangement of the objects in the network;
    displaying a graphical representation of the objects and the environment to a user of the computer node; and
    receiving user input at the computer node that defines the process by defining a plurality of procedures, each being associated with one or more functions that are to be performed by an object in the network, thereby modeling the process and preparing the process to be executed in the network by the objects in the network that can perform the functions associated with the procedures of the process.

14. A method as defined in claim 13, further comprising the act of modifying the environment by performing the acts of:

identifying a new computer that is to be made available in the network;
    defining a functional component of said new computer as a new object by defining functions that said functional component of said new computer is capable of performing;
    modifying the environment by adding the new object thereto; and
    modifying the display of the graphical representation by adding the new object thereto.

15. A method as defined in claim 13, further comprising the act of modifying the environment by performing the acts of:

identifying a new device other than a computer that is to be made available in the network;

defining said new device as a new object by defining functions that said new device is capable of performing;

modifying the environment by adding the new object thereto; and modifying the display of the graphical representation by adding the new object thereto.

16. A method as recited in claim 13, wherein the act of receiving user input at the computer comprises the act of receiving user input that manipulates the graphical representation of the objects and the environment.

* * * * *